(12) United States Patent
Pearce et al.

(10) Patent No.: US 7,383,274 B2
(45) Date of Patent: Jun. 3, 2008

(54) SYSTEMS AND METHODS FOR EFFICIENTLY STORING AND ACCESSING DATA STORAGE SYSTEM PATHS

(75) Inventors: Jeffrey T. Pearce, Sammamish, WA (US); Nigel R. Ellis, Redmond, WA (US); Richard L. Negrin, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 11/084,911

(22) Filed: Mar. 21, 2005

(65) Prior Publication Data

US 2006/0212457 A1    Sep. 21, 2006

(51) Int. Cl.
*G06F 17/30* (2006.01)
(52) U.S. Cl. .......................................... 707/101; 707/2
(58) Field of Classification Search .................... 707/2, 707/3, 101, 104.1
See application file for complete search history.

(56) References Cited

U.S. PATENT DOCUMENTS

| | | | | |
|---|---|---|---|---|
| 5,566,331 A | * | 10/1996 | Irwin et al. | 707/10 |
| 5,778,374 A | * | 7/1998 | Dang et al. | 707/101 |
| 6,470,345 B1 | * | 10/2002 | Doutre et al. | 707/100 |
| 6,529,996 B1 | * | 3/2003 | Nguyen et al. | 711/114 |
| 6,625,591 B1 | * | 9/2003 | Vahalia et al. | 707/1 |
| 6,889,226 B2 | * | 5/2005 | O'Neil et al. | 707/100 |
| 6,915,314 B2 | * | 7/2005 | Jackson et al. | 707/204 |
| 2002/0069324 A1 | * | 6/2002 | Gerasimov et al. | 711/114 |

OTHER PUBLICATIONS

"Upscale Your Database Needs With 64-Bit Technology", at: http://www.microsoft.com/sql/default.mspx, last accessed May 23, 2005, 2 pages.

* cited by examiner

*Primary Examiner*—Pierre Vital
*Assistant Examiner*—E. J Kennedy
(74) *Attorney, Agent, or Firm*—Amin, Turocy & Calvin, LLP

(57) ABSTRACT

The subject invention provides a system and/or a method that facilitates providing a compact representation of a file path associated to a file storage system. A path component can provide seamless integration and/or transition between the file path associated to the file storage system and an item and/or item ID within the data storage system. The path component can utilize a tabular format, wherein such tabular format allows the cross-reference between the file path and item. The compact representation can facilitate at least one of storing, renaming, and searching.

16 Claims, 11 Drawing Sheets

SYSTEMS AND METHODS FOR EFFICIENTLY STORING AND ACCESSING DATA STORAGE SYSTEM PATHS

TECHNICAL FIELD

The present invention generally relates to databases, and more particularly to systems and/or methods that facilitate providing a compact representation of a file path associated with a traditional file storage system that is stored in a relational database system.

BACKGROUND OF THE INVENTION

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Also, the tables can comprise a set of records, wherein a record includes a set of fields. Records are commonly indexed as rows within a table and the record fields are typically indexed as columns, such that a row/column pair of indices can reference particular datum within a table. For example, a row can store a complete data record relating to a sales transaction, a person, or a project. Likewise, columns of the table can define discrete portions of the rows that have the same general data format, wherein the columns can define fields of the records.

Each individual piece of data, standing alone, is generally not very informative. Database applications make data more useful because they help users organize and process the data. The database application allows the user to compare, sort, order, merge, separate and interconnect the data, so that useful information can be generated from the data. Yet, the capacity and versatility of databases have grown to an incredible amount to allow a virtually endless storage capacity utilizing databases. Moreover, typical database systems offer limited query-ability based upon time, file extension, location, and size. For example, in order to search the vast amounts of data associated to a database, a typical search is limited to a file name, a file size, a date of creation, etc., wherein such techniques are deficient and inept.

With a continuing and increasing creation of data from end-users, the problems and difficulties surrounding finding, relating, and storing such data is reaching its peak. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, and designing a compact disc label, all require the creation of data.

Not only are the complications surrounding users, but developers have similar issues with data. Developers create and write a myriad of applications varying from personal applications to highly developed enterprise applications. While creating and/or developing, developers frequently, if not always, gather data. While obtaining such data, the data needs to be stored. In other words, the problems and difficulties surrounding finding, relating, and storing data jeopardizes both the developer and the end user.

Furthermore, traditional databases and/or file storage systems utilize a directory, wherein a file can include a path. Such path is typically a string path containing directory references (e.g., names), folder names, files, etc. The path string can be composed by concatenating such references, folder names, files, etc. such that the path string can relate to a particular file within the database and/or file storage system. For example, a traditional file storage system can have a directory containing a folder "Documents," a sub-folder "Processing," and a file "application.ext," wherein ".ext" can be a file extension specified for the particular database and/or file storage system. Thus, the path string can be "directory\Documents\Processing\application.ext." Utilizing such path string can present several problems. The paths and/or path strings can be large such that storing a path for every item and/or file in the system consumes a large amount of storage space and/or is slow to access. Additionally, typical path strings can be limited with the characters associated therewith. Moreover, renaming files and/or items can affect every item in such database and/or file storage system. In view of the above, there is a need to provide a system and/or method that allows a compact representation of a file path.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate providing a compact representation of a file namespace path. The file path can be associated with a traditional file storage system that utilizes at least one of a directory, a folder, a sub-folder, a file stream, and a file, for example. A path component can provide the compact representation based at least in part upon a hierarchical structure of the file storage system, wherein the compact representation allows seamless transition and/or integration of the file path and an item within a data storage system. The data storage system can be a database based system, wherein an item is the smallest unit of consistency in the data storage system. Moreover, a path to a container can be based on a containment hierarchy, wherein each item has a name (e.g., unique to its container), and the path of a given item is formed by names of ancestor containers recursively up to the container that represents the current connection point.

In accordance with one aspect of the invention, the path component can include an analyzer component that can determine a hierarchical structure and/or a tree structure. The hierarchical structure can be analyzed such that at least one node, leaf node, and/or file can be determined. Based at least upon such analysis, a generator component can generate a compact representation of the hierarchical structure to provide at least one of an efficient storing technique, renaming technique, and searching technique. In one example, the generator component can assign a binary representation to the nodes, leaf nodes, and/or files within the file storage system.

In accordance with another aspect, the path component can include an encode component that can encode the representation such that an efficient search can be employed. In one example, the encode component can employ the Huffman encoding technique. Furthermore, the encode component can invoke a compression of text to facilitate implementation of the subject invention. Additionally, a rename component can facilitate renaming of the items within the data storage system. In particular, the rename component can utilize a table that can provide cross-reference between the file path associated to the file storage system and the compact representation associated to an item and/or an item ID within the data storage system. The rename component allows the renaming of the item to be updated in the data storage system rather than throughout effected children within the hierarchical structure.

In accordance with still another aspect, the path component can include an API component that provides definition of a public interface to manipulate a namespace associated to the item within the data storage system. The API component can provide various return values based at least upon a function call. Furthermore, a query component can be employed to search the data storage system and/or the file storage system. The query component can utilize the compact representation to facilitate searching to provide a fast access to the data storage system. The query component can also invoke a single query that does a single less than and/or greater than check on the items in a transitive closure of the supplied namespace path. In accordance with another aspect of the subject invention, an ordinal path component can be utilized to provide an ordinal path and/or an ordpath. In other aspects of the subject invention, methods are provided that facilitate employing a compact representation for a file path.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
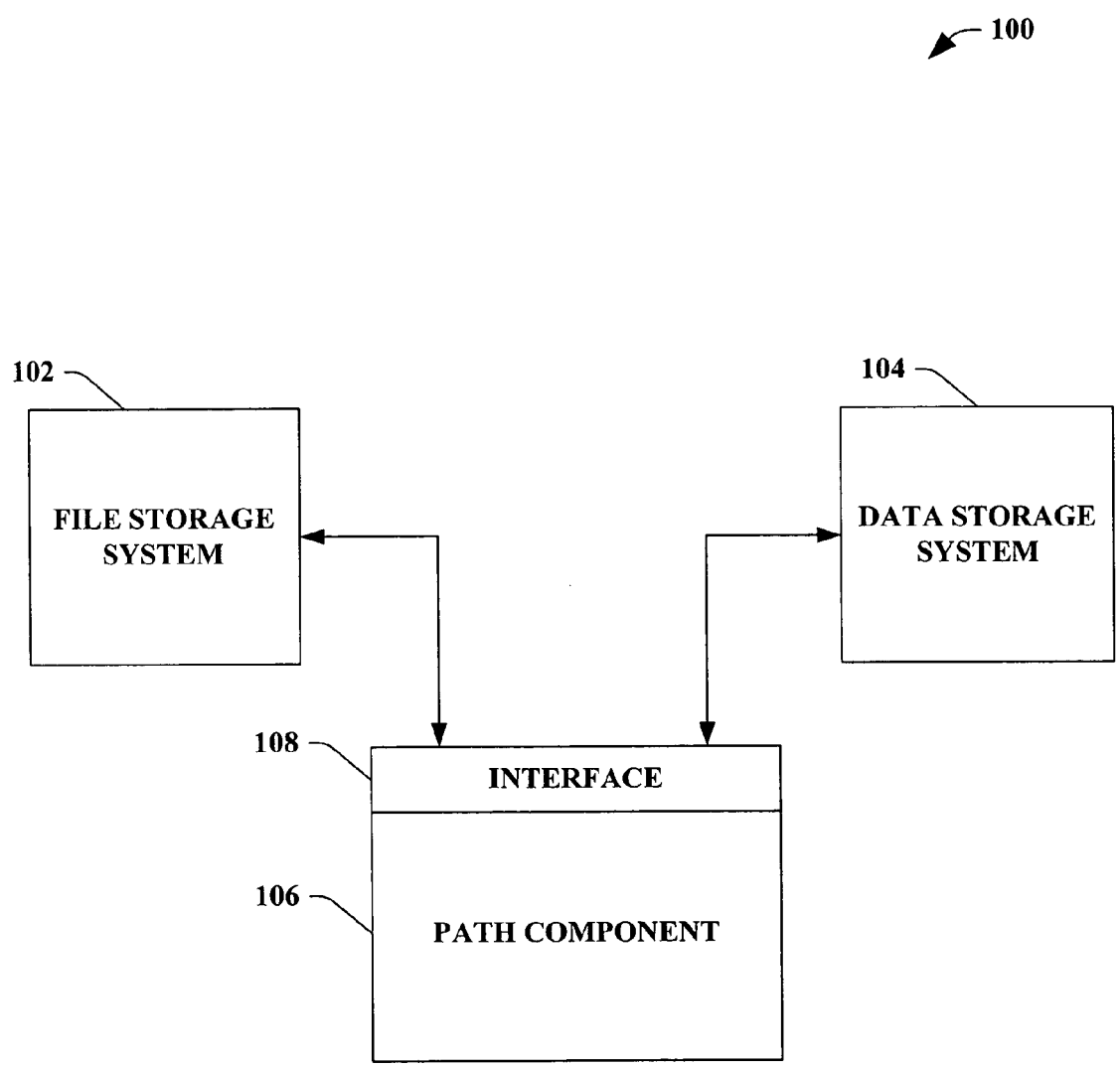
FIG. 1 illustrates a block diagram of an exemplary system that facilitates providing a compact representation of a file path respective to a file storage system.

As utilized in this application, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates providing a compact representation of a file path respective to a file storage system. A file storage system 102 can be a traditional file storage system, wherein the structure is based on a file stream and/or a directory. The file storage system 102 can utilize the file stream such that an application and/or application programming interface (API) can enrich the file stream to provide more structure. A data storage system 104 can be a more complex model based at least upon a database structure, wherein an item, a sub-item, a property, and a relationship are defined to allow the representation of information within the data storage system as instances of complex types. An item can be defined as the smallest unit of consistency in the data storage system 104, which can be independently secured, serialized, synchronized, copied, backup/restored, etc. The item is an instance of a type, wherein all items in the data storage system 104 can be stored in a single global extent of items. The data storage system 104 can be based upon at least one item and/or a container structure. A path to the container can be based on a containment hierarchy, wherein each item is has a name (e.g, unique to its container), and the path of a given item is formed by names of ancestor containers recursively up to the container that represents the current connection point. The last entity of the path is the item's namespace name. Moreover, the data storage system 104 can be a storage platform that exposes rich metadata that is buried in files as items. It is to be appreciated that the data storage system 104 can be a database based file storage system represented by a data model to support the above discussed functionality.

A path component 106 can provide a compact representation of a file path associated to the file storage system 102. The compact representation can be, for example, a number base representation such as, but is not limited to, binary, decimal, octal, hexadecimal, etc. The compact representation can provide a uniform representation of the file storage system 102 to be utilized by the data storage system 104. By utilizing the number base representation, various benefits can be exposed such as the following: 1) file paths can be stored for every item within the data storage system 104 and storage space is greatly reduced; 2) file paths can have unlimited characters and/or special characters; 3) a transitive closure (e.g., discussed infra) under a given item within the data storage system 104 can be provided; and 4) renaming the item within the data storage system 104 is more efficient utilizing the compact representation. Referring to the special characters above, transitive closure queries under a relationship database system can require a LIKE predicate if the actual path is stored instead of the compressed representation. Yet, the LIKE predicate has some characters with special meaning, so if the path contained in any of those special characters, the application and/or API would have to modify those characters before issuing the query. This can be inefficient and limiting the path use. This modification of characters (e.g., referred to as "escaping") can be easier to implement in some programming environments. Although the path component 106 provides converting a tree structure and/or file paths associated to a file storage system 102, it is to be appreciated that such aspect is not limiting on the subject invention. For instance, the path component 106 can provide the compact representation of any suitable tree structure associated to any file storage system, database, storage structure, etc. to allow seamless integration and/or conversion between the file path associated to such tree structure and the compact representation.

The following is an example and is not to be seen as limiting the subject invention. An item can be stored in a database, wherein a user can refer to the item by utilizing an item ID. The item ID can be unique to the system so as an item ID uniquely identifies a single item. Additionally, a path to the item can be utilized, wherein each item has a path that uniquely identifies it in the system. The path for the item in the data storage system 104 exists independent of any additional file storage systems. The path component 106 allows an efficient technique to store paths and utilize such representation of paths in conjunction with the power of a relational database to query for items in a hierarchy. Furthermore, it is to be appreciated that this technique can be applied to any system (including a standard file system) that stores and queries a hierarchy of data.

The system 100 further includes an interface component 108, which provides various adapters, connectors, channels, communication paths, etc. to integrate the path component 106 into virtually any operating system(s). In addition, the interface component 108 can provide various adapters, connectors, channels, communication paths, etc. that provide for interaction with data and the path component 106. It is to be appreciated that although the interface component 108 is incorporated into the path component 106, such implementation is not so limited. For instance, the interface component 108 can be a stand-alone component to receive or transmit the data in relation to the system 100.

Figure 2:
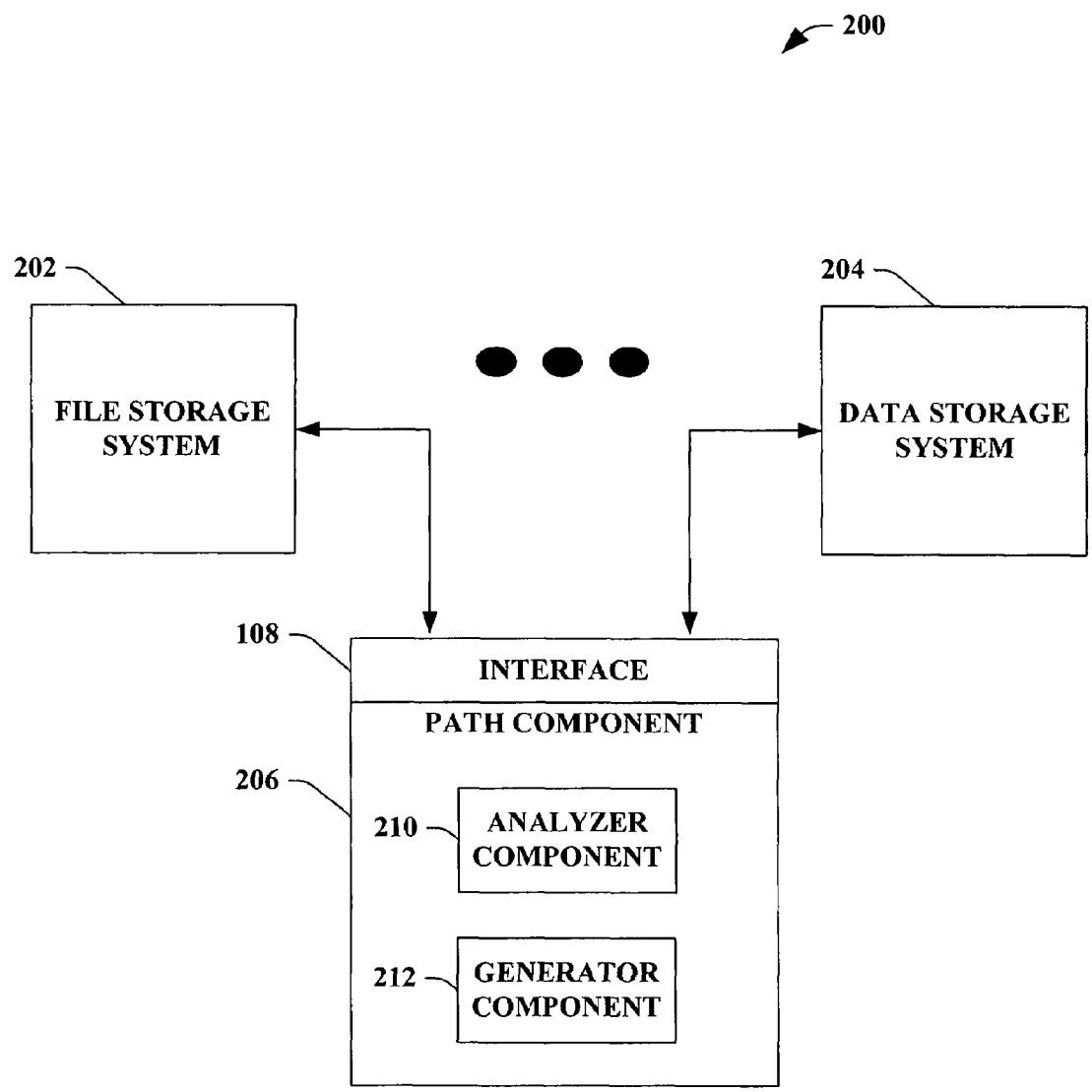
FIG. 2 illustrates a block diagram of an exemplary system that facilitates providing a compact representation of a file path that is utilized by a data storage system.

FIG. 2 illustrates a system 200 that facilitates providing a compact representation of a file path that is utilized by a data storage system. A path component 206 can provide seamless compressed representation between a file storage system 202 and a data storage system 204. However, it is to be appreciated and understood that the path component 206 can provide utilizing a compact representation for a plurality of disparate file systems, file storage systems, data storage systems, databases, etc. The file storage system 202 can be a file stream and directory based file system that utilizes at least one API and/or application. For instance, the API and/or application relating to the file storage system 202 can be, but is not limited to, a 16 bit, 32 bit, etc. version. The data storage system 204 can be a database based complex structure utilizing an item as a unit of consistency, wherein metadata, properties, relationships, etc. are implemented as instances of complex types. The data storage system 204 can be a data model that can describe a shape of data, declare constraints to imply certain semantic consistency on the data, and define semantic associations between the data. By utilizing the path component 206, a tree structure associated to the file storage system 202 can be represented to facilitate compression of the file path in the data storage system 204. As stated supra, the data storage system can utilize items to represent units of information with file paths. By utilizing the compact representation provided by the path component 206, the file paths stored are decreased in size and allow various benefits therewith. It is to be appreciated that the file storage system 202, data storage system 204, and the path component 206 can be substantially similar to the file storage system 102, data storage system 104, and the path component 106 in FIG. 1, respectively.

The path component 206 can include an analyzer component 210 that analyzes the file storage system 202. The analyzer component 210 can determine the directories and/or files associated therewith to facilitate providing the compact representation utilizing a number base (e.g., binary, decimal, hexadecimal, octal, etc.) for implementation within the data storage system 204. The analyzer component 210 can determine a tree structure associated to a file storage system 202, wherein such tree structure elements can be represented as items within the data storage system 204. For example, the tree structure can have various nodes and/or leaf nodes associated therewith. These nodes and/or leaf nodes can have a respective name and/or reference can be analyzed by the analyzer component 210 to facilitate creating the compact representation for the file path within the data storage system 204.

The path component 206 can further include a generator component 212 that creates and/or generates the compact representation that is utilized by the data storage system 204. The generator component 212 can create the compact representation based at least in part upon the analysis of the file storage system 202. In one example, the nodes and/or leaf nodes of the tree structure associated to the file storage system 202 can be numbered (e.g., randomly and/or sequentially), wherein the file path can be represented by the concatenating the numbers. It is to be appreciated that the numbers can then be encoded (e.g., binary, decimal, octal, hexadecimal, etc.). Moreover, a special character can be utilized to represent a root directory within the items associated to the data storage system 204. For instance, the generator component 212 can create and/or generate the compact representation of the tree structure of the file storage system 202, wherein the compact representation allows seamless interaction and/or translation between the file paths within file storage system 202 and items within data storage system 204. In other words, the items within the data storage system 204 can contain and/or utilize the file paths respective to the file storage system 202 without long, comprehensive concatenating names that limit resources.

The compact representation can act as a seamless integration in relation to tree structures and/or node structure between the file storage system 202 and the data storage system 204. Any item of the data storage system 204 can include the file path in the compact representation allowing seamless interaction from file paths in the file storage system 202 and the compact representation of the file path in the data storage system 204. Moreover, the compact representation design the items within the data storage system 204 provide a single query that can utilize "less than" and/or "greater than" checks matched against an efficient index structure built over the compact representation to determine a transitive closure (discussed infra). In addition, generating the compact representation allows another level of indirection, wherein the compact representation need not be altered if an item is renamed within the data storage system 204.

Figure 3:
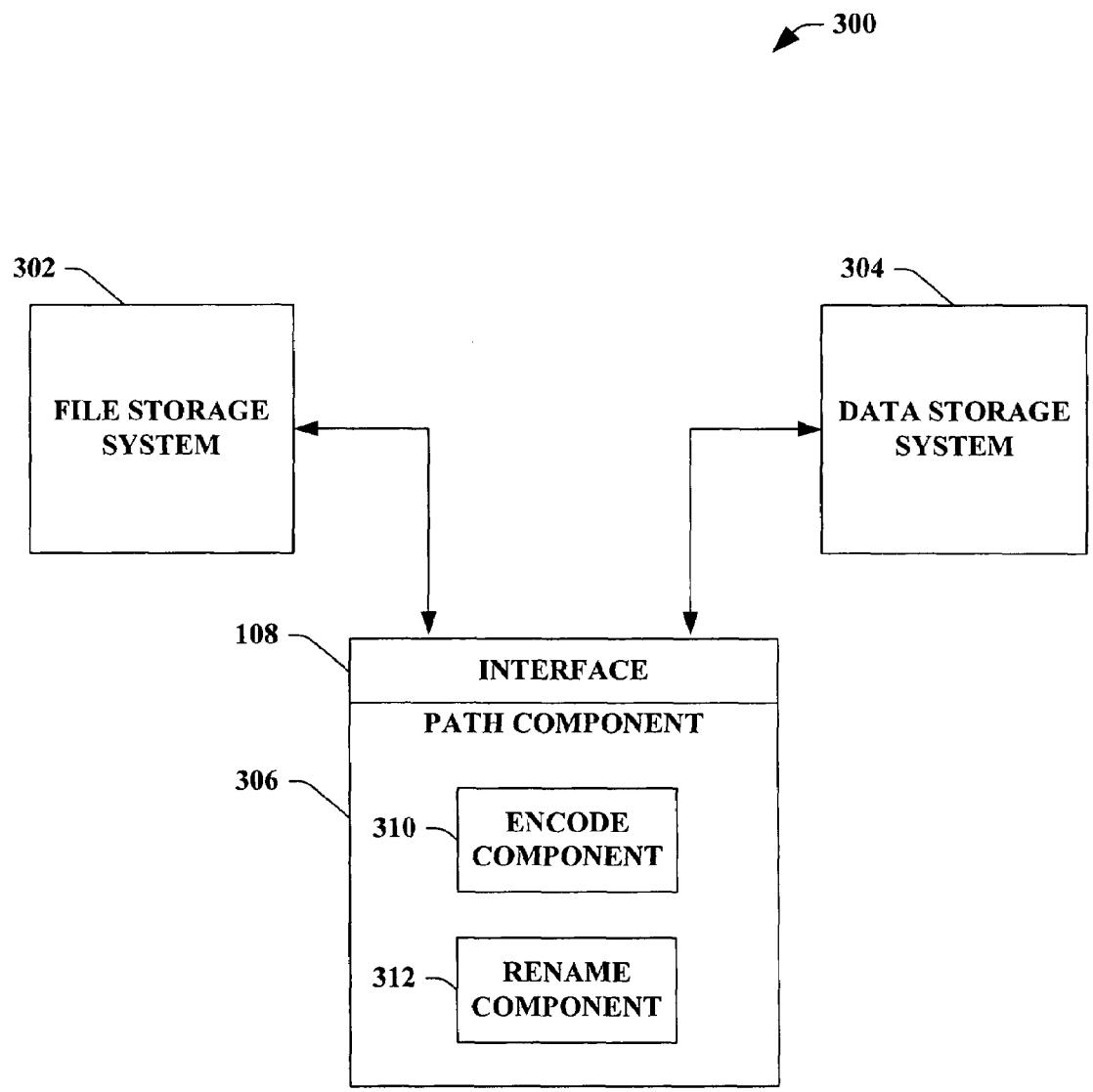
FIG. 3 illustrates a block diagram of an exemplary system that facilitates utilizing a compact representation of a file path within a data storage system.

FIG. 3 illustrates a system 300 that facilitates utilizing a compact representation of a file path within a data storage system. A path component 306 can provide a seamless interaction between a file path within a file storage system 302 and an item path within a data storage system 304. The path component 306 can utilize a compact representation of the file path to be utilized with the respective item within the data storage system 304. For example, the file storage system 302 can include a tree structure with a plurality of nodes and/or leaf nodes, wherein the data storage system 304 can represent each node and/or leaf node as items. Each item within the data storage system 304 can utilize a compressed representation of the file path that relates to the file storage system 302. In one example, the path component can analyze and generate a number (e.g., binary, hexadecimal, octal, any suitable number base, etc.) to represent the nodes and/or leaf nodes associated to the tree structure within the file storage system 302. By utilizing such number representation, the data storage system 304 can concatenate the number representation to reference the file path rather than utilize the name(s) associated to each node and/or leaf node.

The path component 306 can include an encode component 310 that can encode the compact representation of the file paths associated to the file storage system 302 by invoking at least a compression of text. For example, the encode component 310 can encode the compact representation such that a series of patterns can be easily recognized. In other words, a pattern (e.g., bit pattern represented by binary, hexadecimal, octal, etc.) can be selected, wherein the system 300 can determine the respective node by, for instance, a table lookup. It is to be appreciated that the encode component 310 can utilize any suitable technique to encode the compact representation of the file path to be employed in the data storage system 304. Moreover, it is to be appreciated that the encode component 310 can utilize an encoding technique such that allows a query that invokes a less than and greater than on the value of the path handle relative to a location on the tree structure.

The following encoding technique discussed below is only an example—other encoding techniques can be utilized without diverging from the scope of the subject invention. The encode component 310 can employ a Huffman technique, wherein a variable-length code table can be utilized for encoding a source symbol (e.g., a character in a file). The variable-length code table can be derived in a particular way based at least in part upon the estimated probability of occurrence for each possible value of the source symbol. For instance, the particular way can be determined based on the analysis of the tree structure associated to the file storage system 302.

The Huffman coding employed by the encode component 310 can specifically choose the representation for a symbol to result in a prefix-free code (e.g., a bit string that represents a particular symbol is never a prefix of the bit string representing another symbol) that expresses a common character utilizing a shorter string of bits than are utilized for less common source symbols.

The path component 306 can further include a rename component 312 that can facilitate renaming an item within the data storage system by utilizing the compact representation of the file path within the file storage system 302. The rename component 312 can utilize a table that can include numeric representations and the associated file paths, wherein the table and associated data can be renamed. On the contrary, a rename within the file storage system 302 requires a name update for every directory within the tree structure contained underneath. In other words, the rename component 312 provides an efficient technique to rename items within the data storage system 304. Moreover, the compact representation of the file path within the data storage system need not be updated with the name change based at least in part upon utilizing the table to update the corresponding changes.

Figure 4:
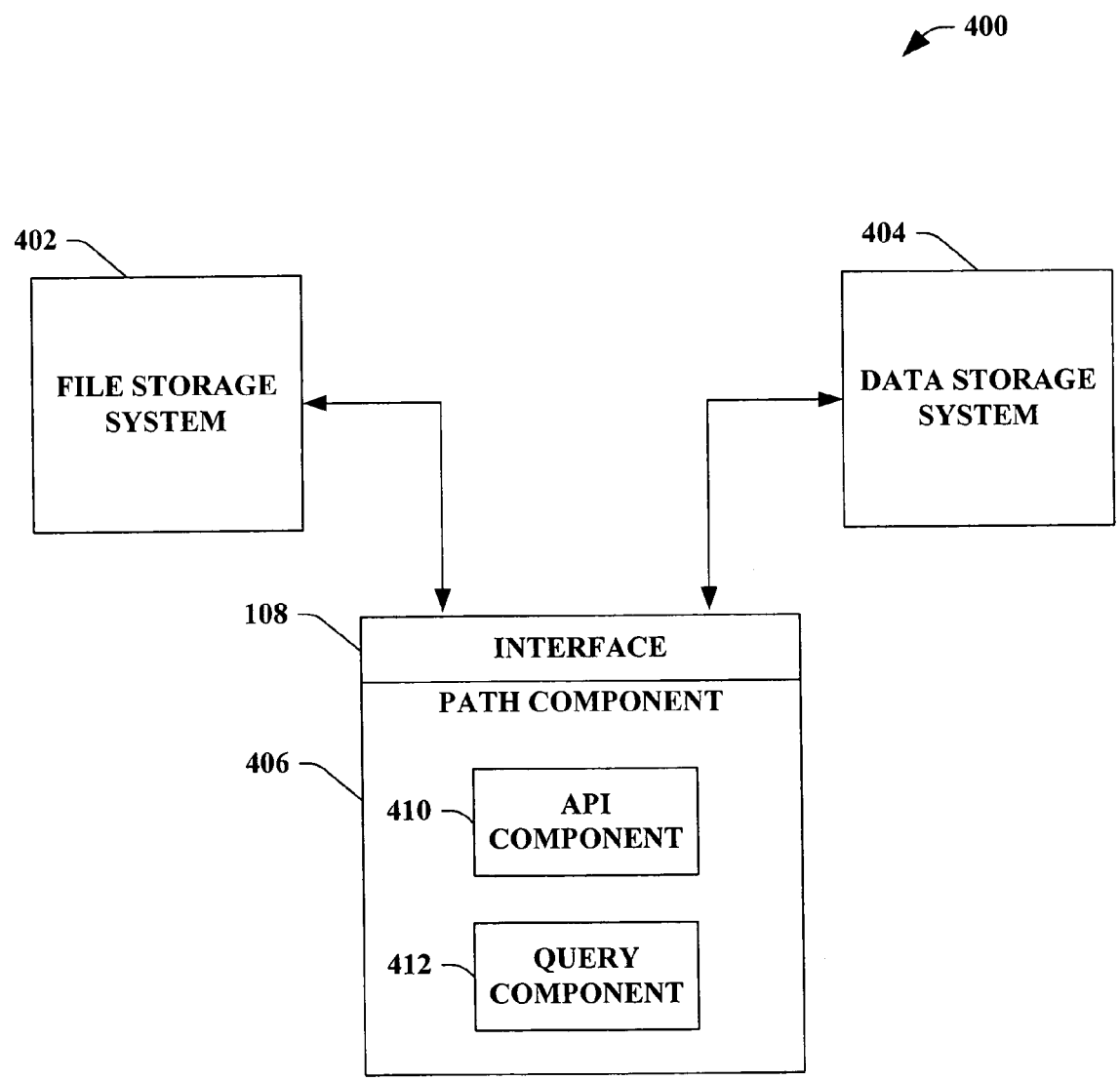
FIG. 4 illustrates a block diagram of an exemplary system that facilitates providing and/or utilizing a compact representation of a file path within a data storage system.

FIG. 4 illustrates a system 400 that facilitates providing and/or utilizing a compact representation of a file path within a data storage system. A path component 406 can provide seamless interaction and/or representation between a file path within a file storage system 402 and an item and/or an item ID within a data storage system 404. The file storage system 402 can be based upon a file stream and include a directory, a folder, and a file. For example, the file storage system 402 can be a 16 bit file system, a 32 bit file system (e.g., a fat file system), a 64 bit file system, wherein the API (e.g., a 16 bit API, a 32 bit API, 64 bit API) utilizes such file system for the respective operating system. The data storage system 404 can be a database based system, and can include a type, an item, a property, a relationship, an instance of a type, a container, etc. It is to be appreciated that the data storage system 404 is to represent units of information as objects with associated metadata and/or properties. Furthermore, the file storage system 402 and the data storage system 404 can be substantially similar to the file storage system 302, 202, and 102, the data storage system 304, 204, and 104 in FIGS. 3, 2, and 1 respectively. The path component 406 can create the compact representation based at least upon the tree structure of the file storage system 402 to allow seamless representation into the data storage system 404.

The file system adapter 406 can include an API component 410, herein referred to as "API 410," that provides definition of a public interface to manipulate a namespace associated to the item within the data storage system 404. The API 410 can provide various return values can be provided based at least upon a function call. The following function calls and return values can be considered examples, such that the subject invention is not so limited. It is to be appreciated that the reference name, function names, type names, etc. can be any suitable code allowing such described implementation.

A "GetPathForID" can include an "itemId" parameter that is an ID of the item for which the path is desired. Utilizing such function call, a table containing a single row with a valid data storage system 404 path (e.g., of type string) if the item is found or an empty table if the item is not found and/or cannot be accessed. The path returned is relative to the current connection point the client made to the storage system (e.g., a current item domain). The current item domain is a path specified by an application when it connects to the store, wherein the connection can access items in the store that are contained in the transitive closure of that path. This can be applied to a query and/or an API. It is to be appreciated that an empty table is returned for the at least one of the following: 1) the item is not found; 2) the item is not accessible from the connection point (e.g., in the current item domain); and 3) the caller does not have access to the item. The API 410 can provide a substantially similar function call "DeletedGetPathForId" including the "itemId" parameter, wherein a table can also be returned. The table can contain a single row with a valid data storage system 404 path and a column including the system status if the item is found or an empty table if the item is not found and/or cannot be accessed. The path returned is relative to the connection point (e.g., the current item domain).

A "GetidForPath" can include a "datastoragesystemPath" parameter, wherein the parameter is the path to the item in the data storage system 404 but the path can be relative to the item domain. The above function call can return a valid item ID or null if the item is found and/or cannot be accessed. The null can be returned for at least one of the following: 1) the path is not found; and 2) the caller does not have access to the item at the specified path.

The API 410 can utilize a function call referenced "ItemsInDomain." This can be a table valued function that returns an item under the specified item (e.g., a transitive closure discussed infra). The result set can include the root (e.g., the item ID passed within). If the specified item is not in the item domain of the connection, this function can return an empty result set. It is permissible to pass the item domain root item ID. The function can include the parameter "itemId" as discussed above. The return value can be a table of an item in the specified domain, wherein the item passed in as a parameter is included. Furthermore, the table can include a single column of item ID's.

A "DeletedItemsInDomain" can include the "itemId" parameter discussed above. The function can be a table valued function that returns items under the specified item including the items that have been deleted. The result set can include the root. If the specified item is not in the item domain of the connection, then this function can return an empty result set. It is permissible to pass the item domain root item ID. The return value can be a table of all the items in the specified domain, wherein the table can include the item passed in as a parameter. The table can include three columns such as, but not limited to, "itemId," "deletedStatus," and "ChangeInformation."

An "ItemsinFolder" function can be a table valued function that returns all the items directly under the specified item. If the specified item is not in the item domain of the connection, then this function can return an empty result set. This function can utilize the parameter "itemId" as discussed supra. The return value can be a table of all the items that are directly contained in this item (e.g., items that have a container ID equal to the "itemId" parameter). The table can also include the item passed in as a parameter, wherein the table can contain a single column of item ID's.

The API 410 can further provide a "deletedItemsInFolder" function that can be a table valued function that returns all of the items under the specified item including the items that are deleted. If the specified item is not in the item domain of the connection, then this function returns an empty result set. The "itemId" parameter can be associated to this function as discussed above. The return value can be, for instance, a table of all the items that are directly contained in this item (e.g., items that have a container ID equal to the "itemId" parameter). The table can include the item passed in a parameter, wherein the table has three columns such as, but not limited to, "itemId," "deletedStatus," and "ChangeInformation."

The path component 406 can include a query component 412 that facilitates searching the data storage system 404 and/or the file storage system 402. The query component 412 can employ the compact representation (e.g., concatenating a number representation of a tree structure associated to the file storage system 402) to facilitate searching to provide a fast access to the data storage system 404. The query component 412 can invoke a single query that does a single less than and/or greater than check on the items in a transitive closure.

The query component 412 can query for all descendants of a particular path related to the data storage system 404. A special handle defined as a descendant limit of the path (e.g., the compact representation) can be guaranteed to be greater than the path value itself but less than any path that can be a sibling. In other words, the following range can be invoked by the query component 412: path<=path of descendants<descendant limit. The descendant limit can also provide the property that it is not itself a valid path value (e.g., otherwise the range may not work with the largest possible descendant).

Various functions can be implemented by the query component 412 to invoke the descendant limit. For example, a function can provide the descendant limit of a path for an item within the data storage system 404. The function can be exposed to a server. The function can return a descendant limit of the path input parameter. In another example, a specified file path can be converted to a path for the data storage system 404. The return value of such can be the path related to the data storage system 404 and/or a null value if the path is a valid path but cannot be converted to a path for the data storage system 404. In yet another example, a function can be utilized to convert the specified data storage system 404 path to a path, wherein the return value is the compact representation of the specified data storage system 404 path and/or a null value if the path cannot be converted.

Figure 5:
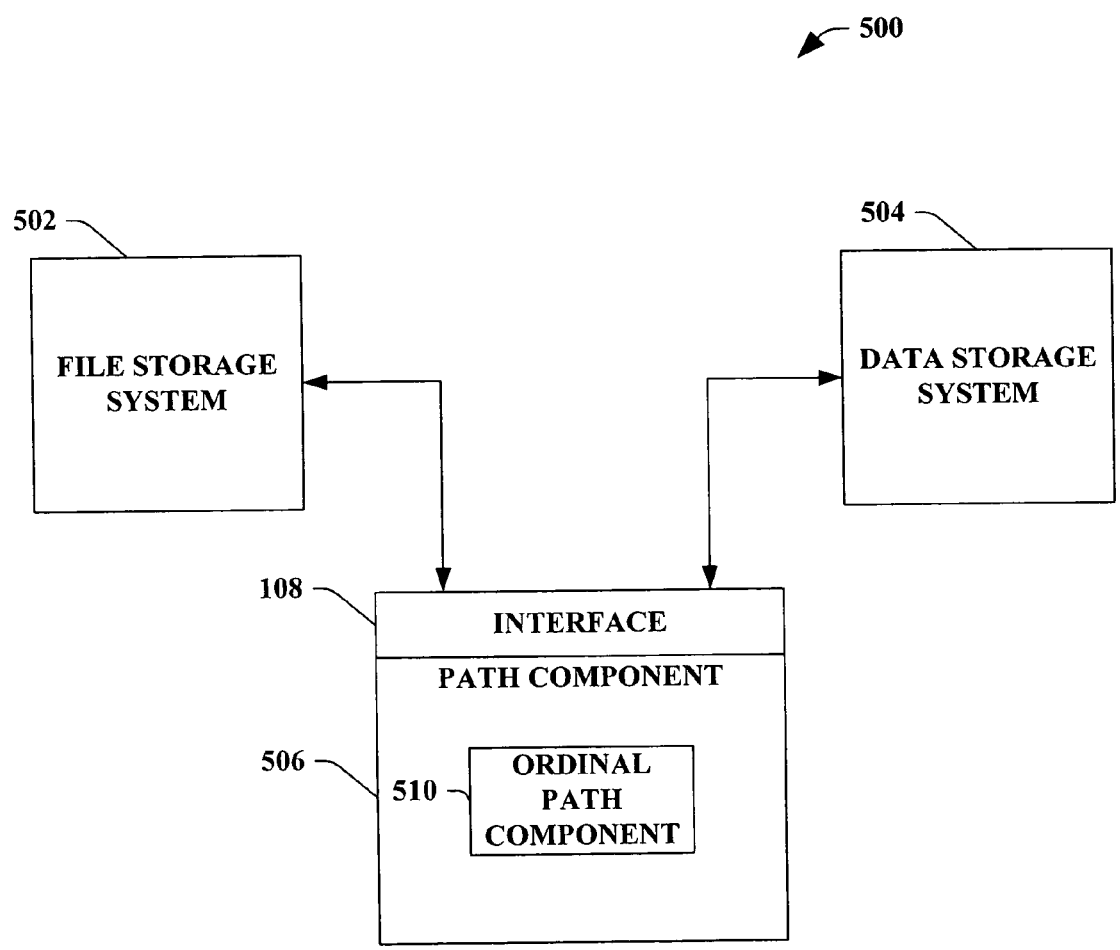
FIG. 5 illustrates a block diagram of an exemplary system that facilitates providing a range for a compact representation of a file path.

FIG. 5 illustrates a system 500 that facilitates providing a range for a compact representation of a file path. A path component 506 can provide a seamless interaction with a file path associated to a file storage system 502 and an item associated with a data storage system 506. It is to be appreciated that the file storage system 502 can be substantially similar to the file storage systems 402, 302, 202, and 102 in FIGS. 4, 3, 2, and 1 respectively. Additionally, the data storage system 504 can be substantially similar to the data storage systems 404, 304, 204, and 104 in FIGS. 4, 3, 2, and 1 respectively.

The path component 506 can include an ordinal path component 510 that provides an ordinal path and/or an ordpath. In the data storage system 504, paths to items can be built up from relationships between folders and the items contained by the folders. Each relationship is given a name, and the path can be built up by concatenating the names separated by backslashes. As discussed supra, the compact representation of the path can be employed. It is to be appreciated that this compact representation can be defined as an ordpath, which can be stored internally as a varbinary column and can be much smaller than the equivalent full path. The ordinal path component 510 can convert an ordpath to an ordinal path, wherein each node is represented as an integer. For example, the path "\operatingsystem\system32\foo.dll" can be converted to "1\1\5." This ordinal path can be compressed into a small varbinary field. The ordpath encoding algorithm can utilize the following design implementations. The following implementations are to be considered examples and not limit the scope of the subject invention.

The ordinal path component 510 can determine the size of the compressed ordpath based at least upon the number of nodes in the path, and on the value of the ordinal (e.g., larger numbers can take up more space to compress). The ordpaths can also support a "fake" node that can be utilized to allow insertion between nodes without reordering the path. This can result in an extra bit per node. The ordpaths can cluster around a "pre-order" traversal of the ordpath tree. This, in conjunction with small size, can make a good choice for the key in the data storage system table. The ordpaths can be exposed as hidden built in functions in debug builds. The ordinal path component 510 can further design the ordpaths to compress small ordinals better than larger ordinals. The following table can show the space to compress ordinals of various ranges.

| Min Ordinal | Max Ordinal | Storage (bits) |
| --- | --- | --- |
| 0 | 3 | 5 |
| 4 | 11 | 6 |
| 12 | 43 | 9 |
| 44 | 171 | 12 |
| 172 | 2219 | 17 |
| 2,220 | 34,987 | 22 |
| 34,988 | 2,147,518,635 | 39 |
| 2,147,518,636 | 140,739,635,873,963 | 55 |

The storage space can be calculated by adding the bits required for each ordinal in the path.

Figure 6:
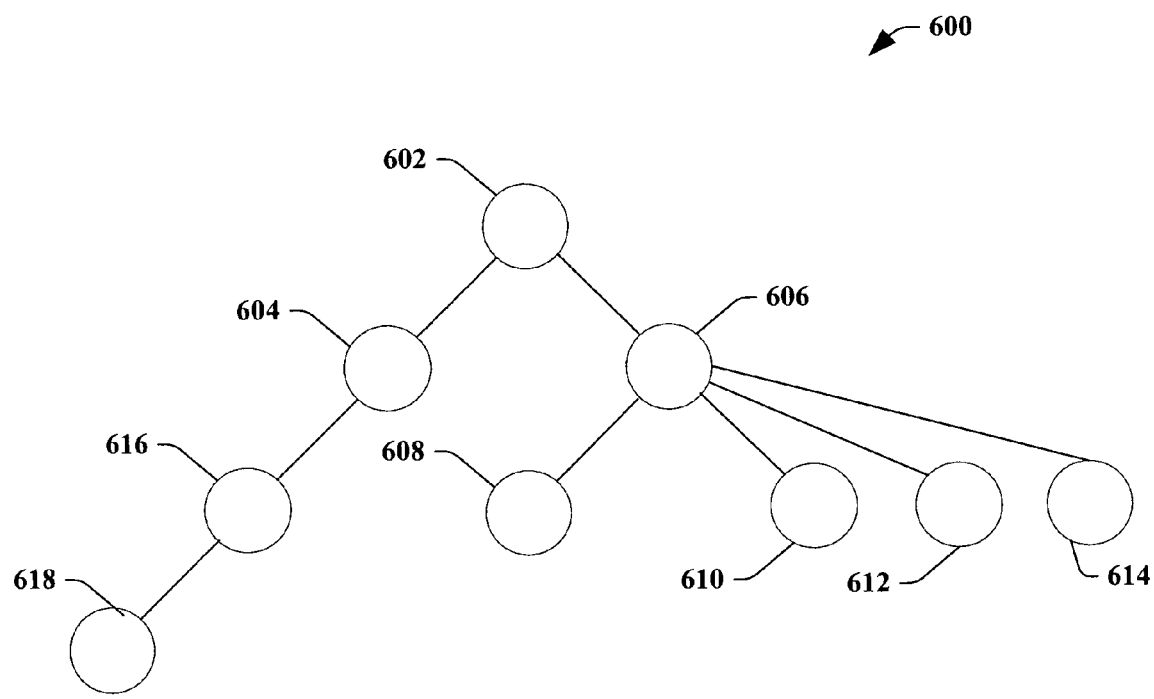
FIG. 6 illustrates a block diagram of a tree structure that facilitates providing and/or utilizing a compact representation of a file path.

FIG. 6 illustrates a tree structure 600 utilized to facilitate illustration of the subject invention. It is to be appreciated and understood that the following example of the tree structure 600 is one particular implementation and is not to be seen as a limitation on the subject invention. The tree structure 600 can include a series of nodes that can be representative of a file storage system (not shown). A main directory 602 can be the root directory for the tree structure 600, wherein the main directory 602 can have a name and/or reference (e.g., C, D, Harddrive1, etc.). The main directory 602 can have at least one sub-directory and/or sub-folder. A sub-folder 604 can be referenced and/or named "Documents" and a sub-folder 606 can be referenced and/or named "Applications." The sub-folder 604 can further include a sub-folder 616, named "Pictures" and a file 618 within the sub-folder 616 that can be referenced as "Beach.ext," where ".ext" is an extension associated with the file storage system. Furthermore, the sub-folder 606 can include a sub-folder 608 referenced as "Games," a sub-folder 610 named "Work," a sub-folder 612 named "Audio," and a sub-folder 614 referenced as "Video."

The tree structure 600 typically provides a file path by concatenating the associated directories, folders, and/or sub-folders to the particular file. For instance, the file 618 can be represented by "Maindirectory\Documents\Pictures\Beach.ext." The storage of such strings can be consuming and an inefficient use of resources. For a data storage system (not shown), a compact representation can be utilized to represent the file path associated to the file storage system. The nodes and/or leaf nodes can be numbered based at least in part upon a position within the tree structure 600. For instance, any suitable numbering technique can be employed. In one example, the nodes and/or leaf nodes can be numbered from left to right wherein the following numbers can be assigned: 0 to file 618; 0 to sub-folder 616; 0 to sub-folder 608; 1 to sub-folder 610; 2 to sub-folder 612; 3 to sub-folder 614; 0 to sub-folder 604; 1 to sub-folder 606; and 1 to the main directory 602. By utilizing the assigned number to represent the file path, the data storage system can drastically reduce the amount of resources necessary to store the paths. Utilizing the compact representation, the file 618 can be represented by "1\0\0\0" instead of utilizing the references and/or names. In another example, the sub-folder 614 can be represented by "1\1\3." It is to be appreciated that the number representation can be encoded utilizing various techniques suitable to facilitate querying, relating, etc. Such techniques for encoding can be, for instance, Huffman encoding that provides a descendant limits (discussed supra). Additionally, the number assignment can be in any suitable number base which includes, but is not limited to, binary, octal, decimal, hexadecimal, . . .

Figure 7:
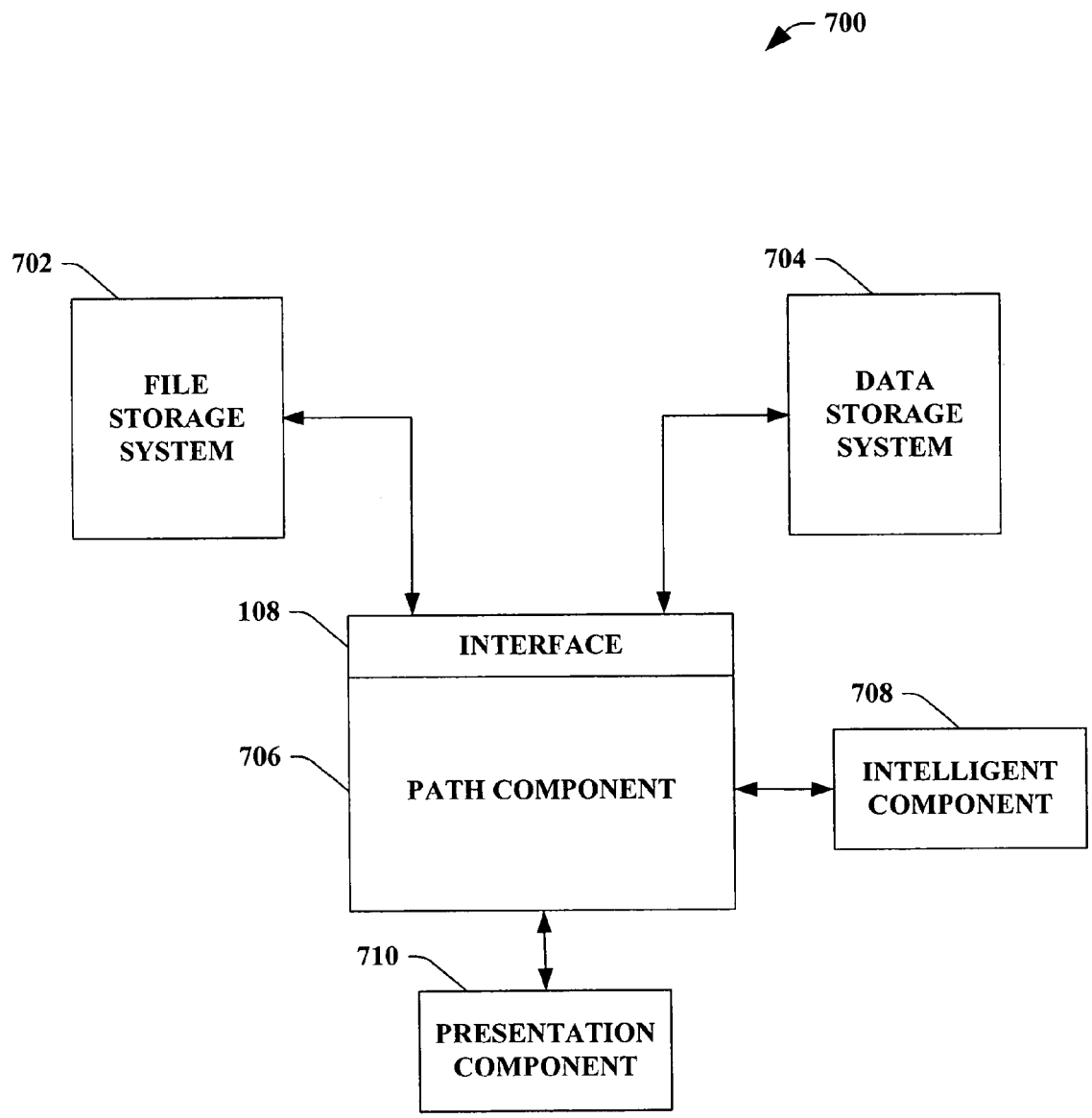
FIG. 7 illustrates a block diagram of an exemplary system that facilitates providing a compact representation of a file path respective to a file storage system.

FIG. 7 illustrates a system 700 that employs intelligence to facilitate providing a compact representation of a file path respective to a file storage system. The system 700 can include a file storage system 702, a data storage system 704, a path component 706, and an interface 108 that can all be substantially similar to respective components described in previous figures. The system 700 further includes an intelligent component 708. The intelligent component 708 can be utilized by the path component 706 to facilitate analyzing, creating, and/or generating a compact representation of a file path associated to the file storage system 702 to be employed with an item associated to the data storage system 704. For example, the intelligent component 708 can be utilized to facilitate determining a tree structure of the file storage system 702.

It is to be understood that the intelligent component 708 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM)

is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 710 can provide various types of user interfaces to facilitate interaction between a user and any component coupled to the file system adapter 706. As depicted, the presentation component 710 is a separate entity that can be utilized with the path component 706. However, it is to be appreciated that the presentation component 710 and/or similar view components can be incorporated into the path component 706 and/or a stand-alone unit. The presentation component 710 can provide one or more graphical user interfaces (GUIs), command line interfaces, and the like. For example, a GUI can be rendered that provides a user with a region or means to load, import, read, etc. data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the path component 706.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
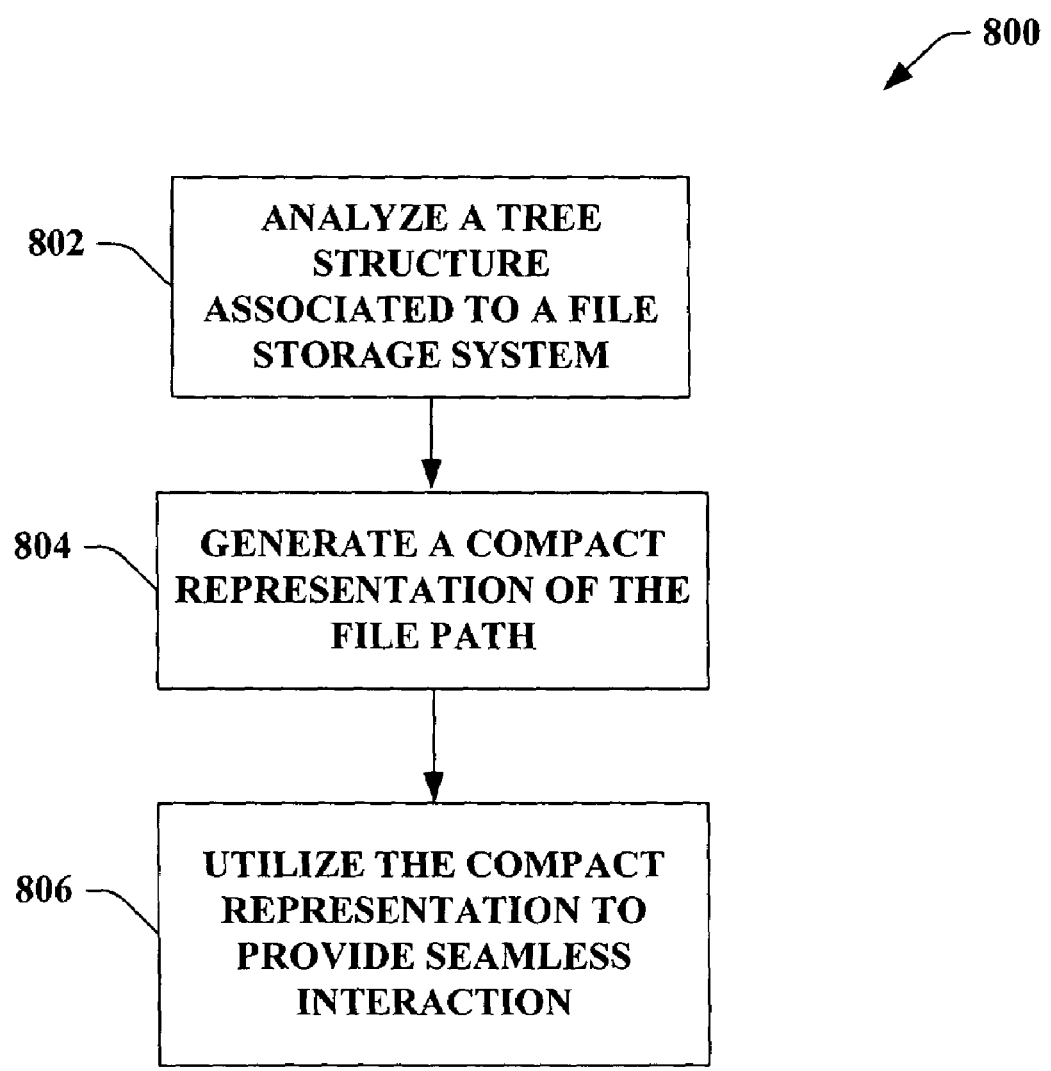
FIG. 8 illustrates an exemplary methodology for providing a compact representation of a file path respective to a file storage system.
Figure 9:
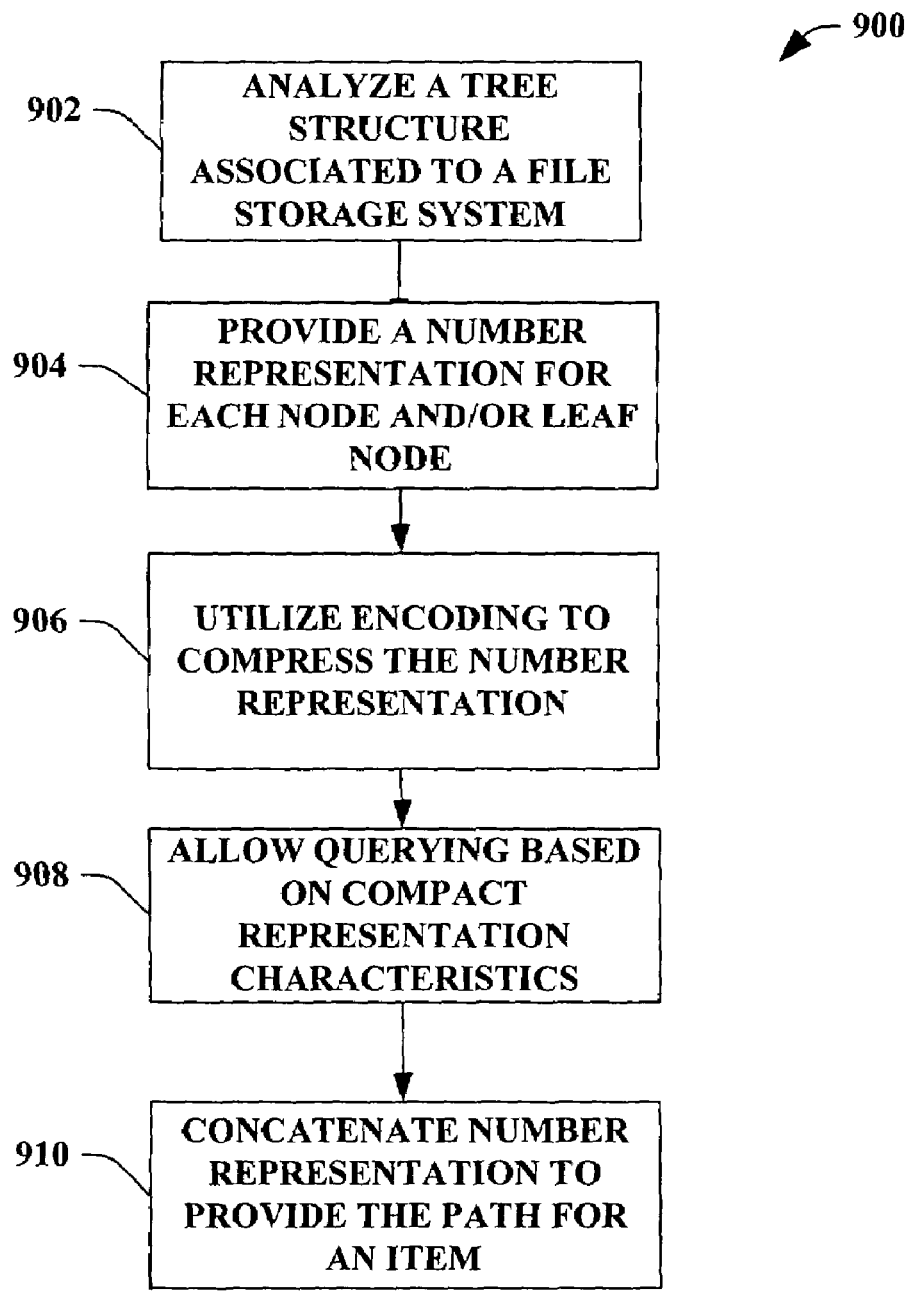
FIG. 9 illustrates an exemplary methodology for providing a compact representation of a file path respective to a file storage system.

FIGS. 8-9 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 8 illustrates a methodology 800 that facilitates providing a compact representation of a file path respective to a file storage system. A file storage system can be a traditional file storage system, wherein a tree structure is associated therewith, such as, but not limited to, a traditional file system. A data storage system can be a database based storage system. An item within such data storage system can be defined as the smallest unit of consistency, which can be independently secured, serialized, synchronized, copied, backup/restored, etc. The item is an instance of a type, wherein all items in the data storage system can be stored in a single global extent of items. The data storage system can be based upon at least one item and/or a container structure. A path to the container can be based on a containment hierarchy, wherein each item is has a name (e.g., unique to its container), and the path of a given item is formed by names of ancestor containers recursively up to the container that represents the current connection point. The last entity of the path is the item's namespace name.

At reference numeral 802, a tree structure associated to the file storage system can be analyzed. For example, the tree structure can contain at least one node and/or leaf node associated to directories, folders, sub-folders, and/or files. Based at least in part upon the analysis of the tree structure of the file storage system, a compact representation of the file path(s) can be generated at reference numeral 804. For instance, the nodes and/or leaf nodes can be assigned a number, wherein the number can represent the node and/or leaf node for the data storage system. It is to be appreciated that the number can be any suitable number base and/or that encoding can be utilized in conjunction with the compact representation. In one example, a table can be utilized to cross-reference the compact representation (e.g., utilized with the item within the data storage system) with the nodes, leaf nodes, and/or respective names (e.g., utilized with the files within the file storage system). At reference numeral 806, the compact representation can be employed to provide seamless interaction between the file paths within the file storage system and the items within the data storage system.

FIG. 9 illustrates a methodology 900 for providing a compact representation of a file path respective to a file storage system. At reference numeral 902, a tree structure associated to a file storage system can be analyzed. The file storage system can be a traditional file system utilizing at least one of a directory, a folder, a sub-folder, a file, and/or a file stream. At reference numeral 904, a number representation can be provided for each node and/or leaf node within the file storage system. It is to be appreciated that the number representation can be any suitable number base including, but is not limited to, binary, decimal, octal, hexadecimal, etc. Furthermore, the assignment of numbers to the nodes and/or leaf nodes can be based on any suitable technique to facilitate the intention of the compact representation. For instance, the number assignment can start from the left of the tree structure moving to the right side until the end of the tree structure. It is to be appreciated and understood that a left to right number assignment is an example and the subject invention is not so limited.

At reference numeral 906, an encoding technique can be utilized to compress the number representation and/or to facilitate querying capabilities. In one example a Huffman technique can be employed. Within the Huffman technique, a variable-length code table can be utilized for encoding a source symbol (e.g., a character in a file). The variable-length code table can be derived in a particular way based at least in part upon the estimated probability of occurrence for each possible value of the source symbol. For instance, the particular way can be determined based on the analysis of the tree structure associated to the file storage system. At reference numeral 908, a querying can be provided based at least upon the compact representation, the encoding characteristics, and/or a combination thereof. For example, the compact representation can be employed such that a descendant limit can be invoked to facilitate querying within items in a data storage system. At reference numeral 910, compact representation and/or the assigned numbers to nodes and/or leaf nodes can be concatenated to allow seamless interaction and/or cross-reference from file paths in the file storage system to items in the data storage system. It is to be appreciated that the data storage system can be a database based storage system that can represent units of information as complex instances of types.

Figure 10:
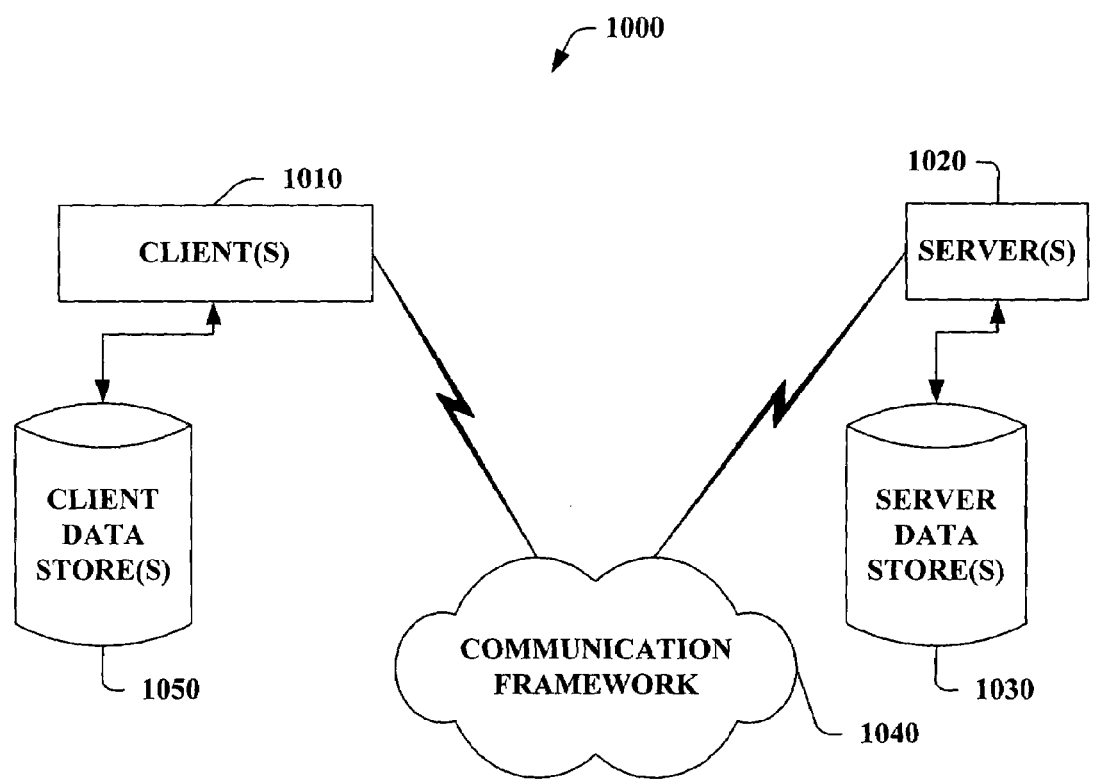
FIG. 10 illustrates an exemplary networking environment, wherein the novel aspects of the subject invention can be employed.
Figure 11:
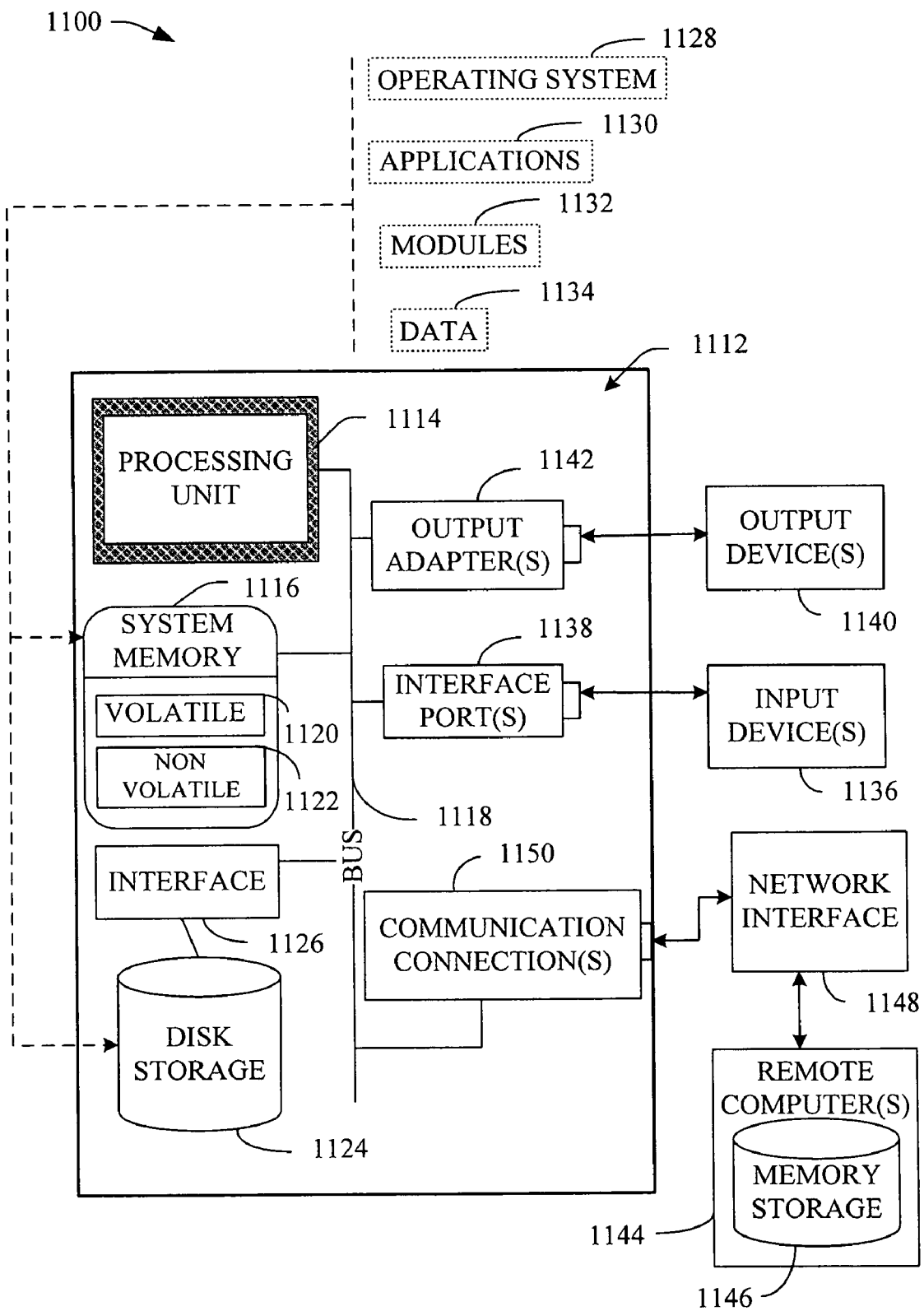
FIG. 11 illustrates an exemplary operating environment that can be employed in accordance with the subject invention.

In order to provide additional context for implementing various aspects of the subject invention, FIGS. 10-11 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject invention, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates providing a compact representation of a file path, comprising:
   a processor;
   an interface that receives a hierarchical structure associated with data stored in a file storage system;
   a path component that provides a compact representation of the hierarchical structure to provide a transition from an item ID to the file path and from the file path to the item ID;
   an analyzer component that analyzes the file storage system to determine a tree structure associated to the file storage system, wherein the tree structure includes at least one of a node, a leaf node, the file path, and a file;
   a generator component that provides the compact representation based at least in part upon the tree structure and the file path, wherein the node, the leaf node and the file are numbered and the file path is represented by concatenating the numbers to allow seamless interacts between file paths with the file storage system and items within a data storage system, such that items with the data storage system utilize the file paths respective to the file storage system; and
   a query component that facilitates searching the data storage system by utilizing at least a descendant limit of the file path that is to be greater than a path value but less than the file path that is a sibling.

2. The system of claim 1, the file storage system is a traditional storage system with at least one of a 16 bit file system, a 32 bit file system, and a 64 bit system that utilizes a file and a directory with an associated file stream to provide more structure and space for an application.

3. The system of claim 1, the data storage system is a database based system that defines at least one of an item, a sub-item, a property, and a relationship to represent information as a complex type.

4. The system of claim 1, the compact representation is a binary representation of the hierarchical structure stored in a tabular format.

5. The system of claim 1, further comprising an encode component that can encode the compact representation.

6. The system of claim 5, the compact representation is encoded with Huffman encoding.

7. The system of claim 1, further comprising rename component that facilitates renaming the item ID within the data storage system by utilizing at least one of the compact representation of the file path within the file storage system and a tabular format.

8. The system of claim 1, further comprising an API component that provides definition of a public interface to manipulate a namespace associated to an item within the data storage system.

9. The system of claim 1, further comprising an ordinal path component that creates at least one of an ordinal path and an ordpath.

10. The system of claim 1, the path component provides the compact representation for at least one of a node, a leaf node, the file path, and a file associated to the file storage system.

11. The system of claim 1, the path component concatenates the compact representation of the hierarchical structure to allow the seamless interaction between the file path within the file storage system and the item ID in the data storage system by employing a table, the seamless interaction allows items within the data storage system to utilize the file paths respective to the file storage system.

12. The system of claim 11, the table provides cross-referencing that facilitates at least one of searching, renaming, and storing within the data storage system.

13. A computer readable medium having stored thereon the components of the system of claim 1.

14. A computer-implemented method that facilitates providing a compact representation of a file path, comprising:
analyzing a tree structure associated with data within a file storage system, wherein the tree structure includes at least one of a node, a leaf node, the file path, and a file;
generating a compact representation of the file path respective to the data, based at least in part upon the tree structure and the file path, wherein the node, the leaf node and the file are numbered and the file path is represented by concatenating the numbers;
utilizing the compact representation to provide seamless interaction between the file path and an item ID associated to a data storage system, such that items with the data storage system utilize the file paths respective to the file storage system; and
searching the data storage system via a query component that utilizes at least a descendant limit of the file path that is to be greater than a path value but less than the file path that is a sibling.

15. The method of claim 14, further comprising at least one of the following:
providing a binary representation for at least one of a node, a leaf node, the file path, and a file associated to the file storage system;
utilizing an encoding technique to compress the binary representation;
querying based at least upon the encoding technique;
renaming an item ID by utilizing a table;
concatenating the binary representation; and
storing the binary representation.

16. A computer-implemented system that facilitates providing a compact representation of a file path, comprising:
a processor;
means for receiving a file path associated with data stored in a file storage system;
means for analyzing the file storage system to determine a tree structure associated to the file storage system, wherein the tree structure includes at least one of a node, a leaf node, the file path, and a file;
means for providing a compact representation of at least one file path to facilitate transition between an item ID and the file path based at least in part upon the tree structure and the file path, wherein the node, the leaf node and the file are numbered and the file path is represented by concatenating the numbers to allow seamless interacts between file paths with the file storage system and items within a data storage system, such that items with the data storage system utilize the file paths respective to the file storage system; and
means for searching the data storage system via a query component that utilizes at least a descendant limit of the file path that is to be greater than a path value but less than the file path that is a sibling.

* * * * *